(12) United States Patent
Nimura et al.

(10) Patent No.: US 6,282,490 B1
(45) Date of Patent: Aug. 28, 2001

(54) MAP DISPLAY DEVICE AND A RECORDING MEDIUM

(75) Inventors: Mitsuhiro Nimura; Hiroyoshi Masuda; Hirofumi Morimoto, all of Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/129,773

(22) Filed: Aug. 6, 1998

(30) Foreign Application Priority Data

Aug. 8, 1997 (JP) ................................................ 9-214779

(51) Int. Cl.⁷ ...................................................... G06F 15/00
(52) U.S. Cl. ............................ 701/208; 701/23; 701/200; 340/990; 340/995; 342/176; 342/178; 345/438; 345/510
(58) Field of Search ..................................... 701/200, 208, 701/211, 72, 23, 26; 342/176, 178, 180, 190, 191; 340/990, 995; 345/133, 419, 427, 438, 510

(56) References Cited

U.S. PATENT DOCUMENTS 5,161,886 * 11/1992 De Jong et al. ...................... 701/209
5,913,918 * 6/1999 Nakano et al. ....................... 701/208

FOREIGN PATENT DOCUMENTS 8-160853   6/1996   (JP) .
8-166249   6/1996   (JP) .
9-127861   5/1997   (JP) .

* cited by examiner

Primary Examiner—Tan Nguyen
Assistant Examiner—Yonel Beaulieu
(74) Attorney, Agent, or Firm—Oliff & Berridge, PLC.

(57) ABSTRACT

A map display device is presented including an information memory device for storing map data, a display device for displaying a map based on map data stored in the information memory device, and a display control device, which has a coordinate transformation device for transforming coordinates on a curved plane into coordinates on a projected plane, for controlling the readout of map data from the information memory device and the map display on the display device. The display control device relates coordinates on the map to coordinates on the curved plane with respect to a coordinate transformation reference point, transforms coordinates on the curved plane into coordinates on the projected plane using the coordinate transformation device, and displays a map on the display device by using the coordinates transformed on the projected plane. Therefore, the device enables a driver to obtain the same sense of distance unaffected by the direction by using the present position. A map of the vicinity of the present position is displayed over a wide area.

15 Claims, 14 Drawing Sheets

FIG. 2A
GUIDANCE ROAD DATA

| NUMBER OF ROADS (n) | |
|---|---|
| l | ROAD NUMBER |
| | LENGTH |
| | ROAD ATTRIBUTE DATA |
| | ADDRESS AND SIZE OF SHAPE DATA |
| | ADDRESS AND SIZE OF GUIDANCE DATA |
| ⋮ | ⋮ |
| n | |

FIG. 2B
SHAPE DATA

| NUMBER OF NODES (m) | |
|---|---|
| l | EASTERN LONGITUDE |
| | NORTHERN LATITUDE |
| ⋮ | ⋮ |
| m | |

FIG. 2C
GUIDANCE DATA

| INTERSECTION NAME |
|---|
| SIGNAL DATA |
| |
| |
| LANDMARK DATA |
| PRECAUTION DATA |
| ROAD NAME DATA |
| ROAD NAME VOICE DATA |
| ADDRESS AND SIZE OF DESTINATION DATA |

FIG. 2D
DESTINATION DATA

| NUMBER OF DESTINATIONS (k) | |
|---|---|
| l | DESTINATION ROAD NUMBER |
| | DESTINATION NAME |
| | ADDRESS AND SIZE OF DESTINATION NAME VOICE DATA |
| | DESTINATION DIRECTION DATA |
| | DRIVING GUIDANCE DATA |
| ⋮ | ⋮ |
| k | |

FIG. 2E
DESTINATION DIRECTION DATA

| -1 : INVALIDITY |
|---|
| 0 : NOT NECESSARY |
| 1 : STRAIGHT AHEAD |
| 2 : RIGHTWARD DIRECTION |
| 3 : DIAGONALLY RIGHTWARD DIRECTION |
| 4 : DIRECTION TO RETURN TO RIGHT |
| 5 : LEFTWARD DIRECTION |
| 6 : DIAGONALLY LEFTWARD DIRECTION |
| 7 : DIRECTION TO RETURN TO LEFT |

ROAD ATTRIBUTE DATA

| OVERPASS/ UNDERPASS DATA | OVERPASS | |
|---|---|---|
| | ROAD ALONGSIDE OVERPASS | ○ |
| | UNDERPASS | |
| | ROAD ALONGSIDE UNDERPASS | |
| NUMBER OF LANES | 3 LANES OR MORE | |
| | 2 LANES | ○ |
| | ONE LANES | |
| | NO CENTER LINE | |
| CITY AREA/SUBURBS | CITY AREA ROAD | ○ |
| | SUBURBS ROAD | |

FIG. 3A

ROAD NAME DATA

| ROAD TYPE | IN-TYPE NUMBER |
|---|---|

| EXPRESS-WAY | MAIN LINE | 1 |
|---|---|---|
| | ANCILLARY ROAD | 2 |
| MUNICIPAL EXPRESS-WAY | MAIN LINE | 3 |
| | ANCILLARY ROAD | 4 |
| TOLL ROAD | MAIN LINE | 5 |
| | ANCILLARY ROAD | 6 |
| GENERAL ROAD { NATIONAL ROAD | | 7 |
| PREFECTURAL ROAD | | 8 |
| OTHERS | | 9 |

FIG. 3B

PRECAUTION DATA

| RAILROAD CROSSING | ○ |
|---|---|
| TUNNEL ENTRANCE | |
| TUNNEL EXIT | |
| ROAD WITH REDUCED POINT | |
| NO INFORMATION | |

FIG. 3C

DRIVING GUIDANCE DATA

| BEAR RIGHT | |
|---|---|
| BEAR LEFT | |
| BEAR TOWARD CENTER | ○ |
| NO INFORMATION | |

FIG. 3D

FIG.5
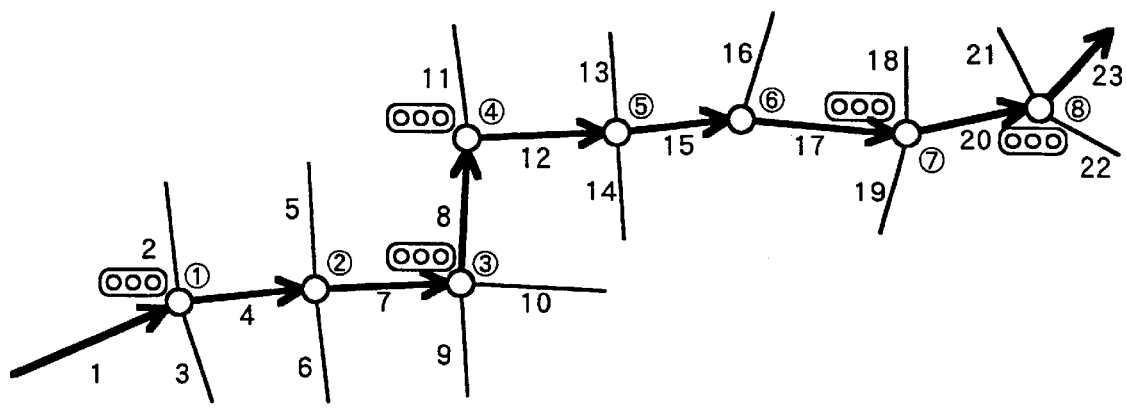
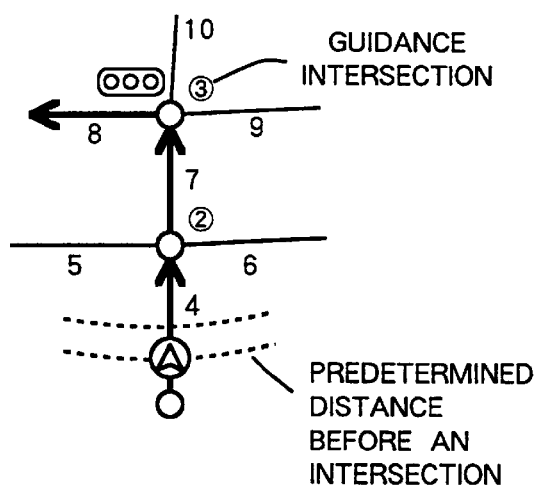
GUIDANCE INTERSECTION
PREDETERMINED DISTANCE BEFORE AN INTERSECTION
GUIDANCE ROAD NUMBER DATA
| NUMBER OF GUIDANCE ROADS(n) |
| --- |
| 1 |
| 4 |
| 7 |
| 8 |
| 12 |
| ⋮ |
| |
| |

FIG. 7

| DISTANCE d FROM THE PRESENT POSITION | TRANSFORMATION PARAMETER |
|---|---|
| $d \leq D_1$ | $f_1(d)$ |
| $D_1 < d \leq D_2$ | $f_2(d)$ |
| ⋮ | ⋮ |
| $D_n < d$ | $f_n(d)$ |

BEFORE COORDINATE
TRANSFORMATION

AFTER COORDINATE
TRANSFORMATION

BEFORE COORDINATE
TRANSFORMATION

AFTER COORDINATE
TRANSFORMATION

MAP DISPLAY DEVICE AND A RECORDING MEDIUM

BACKGROUND OF THE INVENTION

1. Field of Invention

This invention relates to a map display device which transforms the coordinates of map data, and displays a map by using the transformed coordinates.

2. Description of Related Art

There are various types of vehicle navigation systems providing a driver with guidance information along a vehicle travel route, such as a navigation system that searches for a route to a destination and provides audio/visual guidance of characteristic information on the map regarding the route to the destination, and a navigation system that displays a map centering the present position and provides information about the vicinity of the present position, etc. For example, regarding a vehicle navigation system having functions, such as route search and route guidance, there are proposed systems, for displaying a travel image on a 3-D screen in order for the driver to comprehend information on the travel direction at a glance, and for displaying a road map from a bird's-eye view method, which magnifies a road map of the vicinity of the present position of a vehicle. (e.g. Japanese Patent Publication No. 160853/96, No. 166249/96 and No. 127861/97).

Some of the previously proposed systems display a wide-area map by setting a window display area on part of the bird's-eye view and designating the displayed area by a frame in order to improve the defects of the bird's-eye view this makes it difficult for the driver to sense distances and the dimensions of the road map area. Some other systems display a plane map or a bird's-eye view close to a plane map at the top of the displayed area within the predetermined area in order for the driver to receive accurate road distance information.

The above mentioned bird's-eye view displays a wider area than a plane map does, however, this applies to only one direction (Y direction) which is in the forward direction of the present position. Furthermore, as only the vertical direction of the screen is compressed, the sense of distance is different between vertical direction and horizontal direction. The distortion produced in the vicinity of the present position causes the driver to lose the sense of distance during the movement of the vehicle because the ratio between the actual travel distance and the distance shown by the movement of the present position mark on the screen differs according to the direction.

SUMMARY OF THE INVENTION

An aspect of the invention is to provide the sense of distance unaffected by the direction using a present position and a display wide area map in the forward direction.

In order to attain the aspect as described above there is provided a map display device, comprising an information memory device for storing map data, a display device for displaying a map based on map data stored in the information memory device, and a display control device which has a coordinate transformation device for transforming the coordinates on a curved plane into the coordinates on a projected plane for controlling the readout of map data from the information memory device and the map display on the display device. In addition, the display control device relates the coordinates on the map to coordinates on the curved plane with respect to a coordinate transformation reference point, transforms the coordinates on the curved plane into coordinates on the projected plane using the coordinate transformation device, and displays a map on the display device by using the coordinates transformed on the projected plane.

Further, the display control device regards a curved plane as a spherical plane, an oval spherical plane, or a partial circular cone plane. Map coordinates in the area within the predetermined radius around a coordinate transformation reference point are regarded as coordinates on the plane. Map coordinates in the area outside the predetermined radius are regarded as coordinates on the curved plane. The map coordinates on the curved plane which curvature is gradually reduced at every fixed radius around a coordinate transformation reference point, or only the X-coordinates of the coordinates on the map below the coordinate transformation reference point are regarded as a center point coordinates on the curved plane. The various coordinates are transferred into the respective coordinates on the projected plane by the coordinate transformation device.

BRIEF DESCRIPTION OF THE DRAWINGS

The invention will be described with reference to the drawing in which:

FIGS. 2A–2E are diagrams showing an example of the structure of such as guidance road data, etc.

FIGS. 3A–3D are diagrams showing an example of the structure of such as road attribution data, etc.

FIG. 5 is a diagram for describing a route set by route search shown in FIG. 4.

FIG. 7 is a diagram for describing an example of coordinate transformation parameter table for display processing of a map.

DETAILED DESCRIPTION OF PREFERRED EMBODIMENTS

One embodiment of the present invention will be described below with reference to the drawings.

Figure 1:
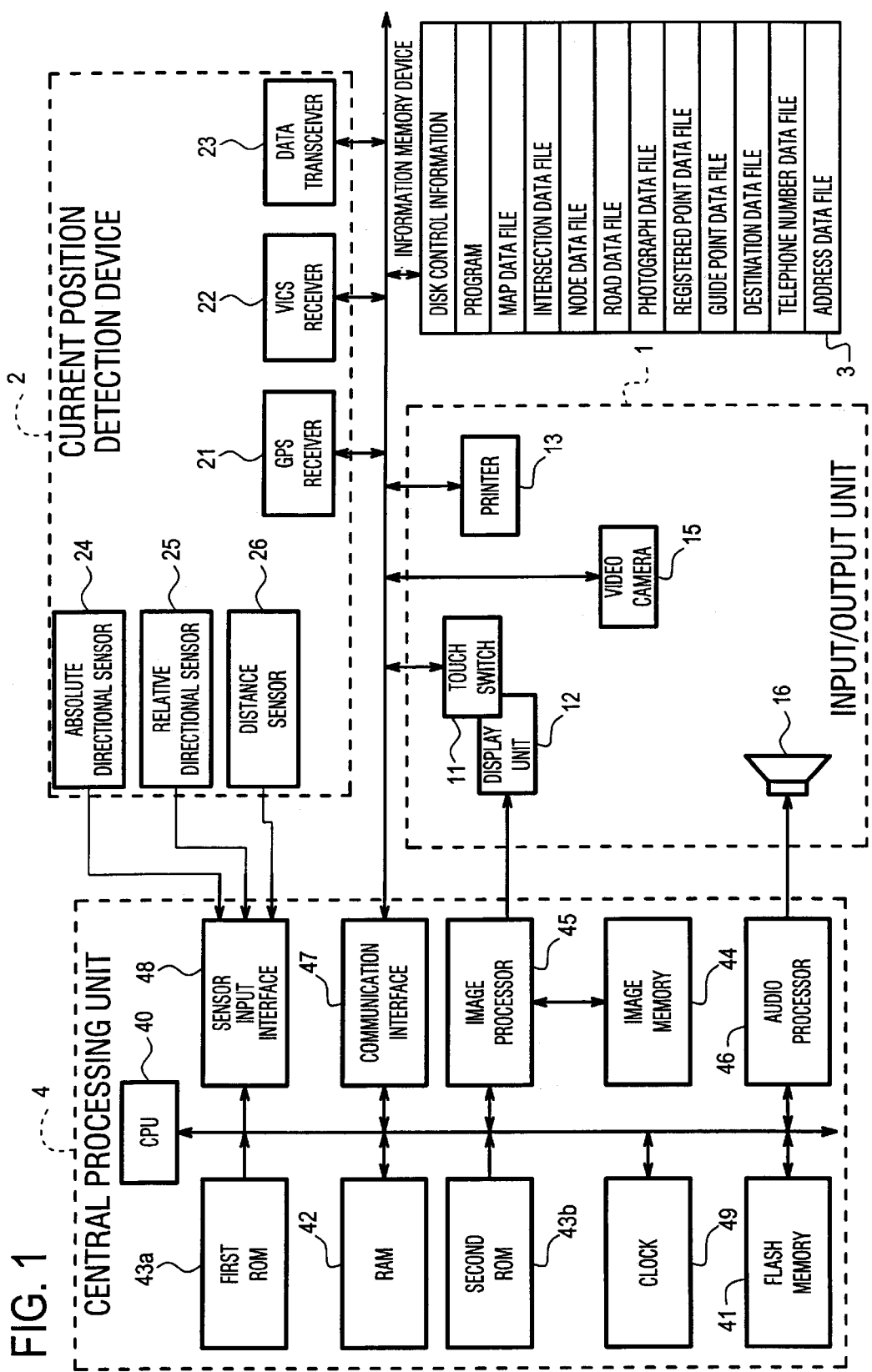
FIG. 1 is a diagram showing one embodiment of the vehicle navigation system according to the present invention.

FIG. 1 is a diagram showing one embodiment of a vehicle navigation system according to the invention. FIGS. 2A–2E are diagrams showing one embodiment of a structure, such as road guidance data, etc. FIG. 3 is a diagram showing one embodiment of a structure, such as road attribution data, etc.

A vehicle navigation system according to the invention comprises an input/output unit 1 for inputting/outputting information relating to route guidance, and for selection and execution of various functions; a present position detection device (present position detection means) 2 for detecting information relating to the present position of a vehicle; an information memory device (information recording means) 3 in which navigation data necessary for route calculation, and visual/audio guidance data necessary for route guidance and programs (application and/or OS), etc. have been stored, and a central processing unit 4 for executing audio/visual guidance processing necessary for route search processing and route guidance, and for control of the overall system. The following is the description of these respective structures.

The input/output unit 1 functions to enter destinations, to allow the driver to instruct the central processing unit 4 to execute navigation processing in such a manner that guidance information can be outputted by voice and/or a screen display, and to print out processed data. As a way for implementing these functions, the input section of the input/output unit 1 has a touch switch 11 and operation switch for entering a destination in the form of a telephone number or coordinates on a map, and for requesting route guidance. It is also possible to use an input device, such as a remote control or other similar input device, as an alternative of the touch switch 11 and operation switch, or as a combination thereof. Further, the input section comprises a video camera 15 for recording scenery in the forward direction of the vehicle. The output section has a display (display output means) 12 for displaying input data on a screen, moreover, for automatically displaying route guidance on the screen in response to a request from the driver, a printer 13 for printing out data processed by the central processing unit 4 and data stored in the information memory device 3, and a speaker (audio output means) 16 for audibly outputting route guidance.

It is possible to add a voice recognition unit for enabling voice input and/or a record card reader for reading data recorded on an IC or magnetic card. It is also possible to add a data communication device for exchanging data between an information source, such as a personal computer in which the driver's own data, e.g. map data, destination data, etc., has previously been stored.

The display 12 comprises a color CRT or color liquid-crystal display device. On the basis of map data and guidance data processed by the central processing unit 4, the display 12 outputs as a color display, all screens necessary for navigation, such as a route setting screen, a screen of an interval view, a screen of intersections, etc. The display 12 also displays buttons for setting route guidance, changing over guidance screens during the route instruction, and invoking selection menus of various functions. In particular, transit-intersection information, such as the names of the intersections to be traversed, is displayed in color in the forms of a pop-up menu on the interval view screen when required.

The display 12 is provided inside the instrument panel in the vicinity of the driver's seat. Observing the displayed map enables the driver to ascertain the present location of the vehicle and to obtain information regarding a route from this location. Further, the display 12 is provided with the touch switch 11 that corresponds to a display of function buttons. The operation described above are executed based upon signals entered by touching the buttons. Input signal generating means may comprise the buttons and touch switch as the input section, though a detailed description thereof is omitted.

The present position detection device 2 detects or receives information on the present position of the vehicle. The present position detection device 2 comprises an absolute directional sensor 24 such as a geomagnetic sensor, etc., a relative directional sensor 25 such as a steering sensor, or a gyro sensor, etc., a velocity sensor 26 for detecting travel distance from the number of revolutions of a wheel, a GPS receiver 21 which utilizes a global positioning system (GPS), and a communication device. The communication device comprises a VICS traffic information receiver 22 and a data transceiver 23. The VICS (Vehicle Information & Communication System) receiver transmits traffic information to the vehicle in real time utilizing FM multiplex signals (multiplexed text broadcasting), radio beacons, optical beacons, etc. An FM multiplex signal transmits rough information in a wide area. Radio beacons and optical beacons transmit detailed information in a confined area of an approximately 10-km radius from the beacons and the vehicle receives the information when passing by the beacon. VICS transmission data comprises the degree of traffic congestion (e.g. no passage, congested, crowded, dense traffic, regular traffic), the source and length position of traffic congestion, traffic control (road construction information, no passage, etc.), and the length of travel time (required time at the predetermined speed) corresponding to the link numbers of the respective roads. Further, the data transceiver 23, such as a cellular phone or a personal computer, communicates information required for navigation guidance bi-directionally with the traffic information center when required by a driver.

The information memory device 3 is an external storage device for storing navigation programs and data in external storage medium such as CDROM (hereinafter referred to as CD), DVD (Digital Video Disc), optical CD, IC Card, etc. The program comprises a map drawing section, a route search section, a route guidance section, a present position calculation section, and a destination setting operation control section, etc. Further, the program comprises an application section and an OS (operating system) section for executing signal processing of the navigation system for a route search, a display output control required for route display guidance, a program for executing audio output control necessary for audio guidance and data required for the program, and also display information data necessary for route guidance and map display. The data contains the record of all data necessary for the navigation system, such as map data, intersection data, road data, and various guidance data.

The navigation programs include a program (route search means) for setting a destination and a way (or passing) point on the basis of position information from a present position detection device 2 and signals input from the input device 11, and performing route search by using search road data, a program for executing route search again by converting search road data on the basis of traffic information obtained from the communication device, a program (route information conversion means) for converting the searched route so that the searched route can be displayed in the form of 3D images, a program for determining audio output timing and audio phrases pursuant to the map drawing, matching and route, and a program for identifying characteristics from images captured through a video camera 15 (image photographing means), determining the relative moving direction of identified characteristics on the display, and determining a travel route based on the moving direction. The respective functions of the navigation system according to the invention are performed by activating the programs stored in information recording device 3. In the embodiment of the invention, the programs for performing the functions of the present invention are stored in the information memory device 3 which is an external recording medium.

All of the programs or a part of the programs, and all the data or a part of the data for performing the functions of the invention can be received through a data transceiver 23 from the information center or from other vehicles and stored in a flash memory 41 or RAM 42.

A central processing unit 4 comprises a CPU 40 for performing various calculation processing, and a flash memory 41 for reading and storing a program from a CD installed in information memory device 3. The flash memory 41 can be rewritten by erasing the stored program when a program stored in a CD is changed. The central processing unit 4 comprises a first and second ROM 43a, 43b, respectively. The first ROM 43a stores a program (program reading means) which executes program check and update processing of the flash memory 41 and RAM 42 for temporarily storing searched route guidance information such as position coordinates of a set destination, road code number, etc. and data under calculation processing. The second ROM 43b stores display information data required for route guidance and map display. The program for performing update processing can be stored in an external storage device.

Further, the central processing unit 4 comprises an image memory 44 in which image data for display on the screen is stored; an image processor 45 which, on the basis of a display control signal from the CPU 40, extracts image data from the image memory 44 and delivers the data to the display unit upon subjecting to image processing; an audio processor 46 which, on the basis of an audio-output control signal from the CPU 40, combines audio, phrases, single sentences and sounds, etc. read out of the RAM 42, converts the result to an analog signal and delivers the analog signal to the speaker 16; a communication interface 47 for performing an exchange of input/output data by the communicating device; a sensor-input interface 48 for accepting a sensor signal from the present-position detecting device 2; and a clock 49 for entering the date and time to internal dialog information.

A photographed image is converted from analog signals to digital signals through the CPU 40, and recorded into RAM 42. From this image data, landmarks such as intersections and turning points are identified and image identification processing is executed. In this image identification processing, landmarks are identified by referring to image data file color and feature information stored in the information memory device 3.

In the central processing unit 4, the CPU 40 adopts data obtained from the respective sensors of the present position detection system 2 through the sensor input interface 48, and calculates present position coordinates at established periods and temporarily stores the coordinate in RAM 42. These present position coordinates results from map matching in consideration of detection error of various data. Correction of output values from various sensors is constantly performed. Route guidance is performed through both screen display and audio output and a driver can select route navigation with or without audio output.

A program required for route navigation can be stored in advance in ROM 43a of central processing system 4 or in the information memory device (recording medium) 3. If the program is stored in the information memory device 3, the program is renewed and the renewed program is executed when the system reads the program from information memory device 3 and stores the read program in a flash memory 41. The navigation system can be operated by temporarily storing the read program from information memory device 3 in RAM 42.

FIGS. 2A–2E to 3A–3D illustrate exemplary structures of main data files stored in the information memory device 3. A guidance road data file, as shown in FIG. 2A, comprises, for each of n roads, a road number, length, road attribution data, shape data address and size, and guidance data address and size, and is stored in the form of the data necessary for providing a route guidance based on route search executed by the route search section.

Figure 13A:
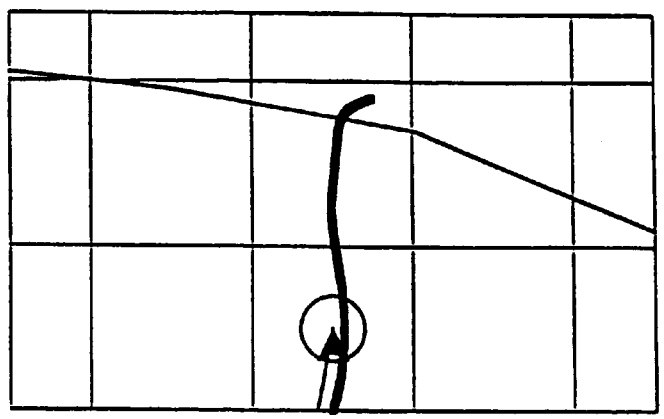
FIGS. 13A–13C are diagrams for describing the examples of the map display by comparing detailed plane map with a map of which coordinates are transformed.

The road number is set, according to the direction (outbound or inbound) for each road section between intersections. The road attribution data is road guidance supplemental information data and, as shown in FIG. 13A, is composed of data, such as whether the road is an overpass, a road alongside an overpass, an underpass or a road alongside an underpass, data on the number of the lanes, and whether the road is in the city or in the suburbs. The shape data, as shown in FIG. 2B, has coordinate data which, when each road is divided into a plurality of nodes, comprises east longitude and north latitude data for each of m nodes. The guidance data, as shown in FIG. 2C, comprises data such as intersection (branch point) names, traffic light data, landmark data, precaution data, road name data, road name voice data, address and size of course data.

In the collection of the guidance data, the precaution data, as shown in FIG. 3C, indicates information on whether there is a railroad crossing, a tunnel entrance or exit, a point of reduced road width, or that no information exists (i.e. normal road conditions exist). The data is to warn the driver of the presence of conditions where caution should be exercised, such as a railroad crossing or a tunnel, except for intersections and branch points. The road name data, as shown in FIG. 3B, indicates information on the road category, such as a highway, city highway, toll road, and ordinary road (national road, prefectural road, etc.), and whether the highway, city highway or tall road is a main road or a junction. This data is composed of road classification data and classification numbers, namely individual number data for each road classification. The destination data, as shown in FIG. 2D, comprises the road number and names of destinations, the address and size of the destination name voice data, destination direction data, and travel guidance data.

In the collection of the destination data, the destination direction data as shown in FIG. 2E, indicates information such as invalidity (meaning that the destination direction data is not used), disuse or not necessary (guidance is not given), straight ahead, right direction, slight right direction, sharp right direction, left direction, slight left direction, sharp left direction. The travel guidance data, as shown FIG. 3D, stores data for instructing the driver which lane to take when there are a plurality of lanes, or to enable the driver to select among right, left, and center, or do nothing.

Figure 4:
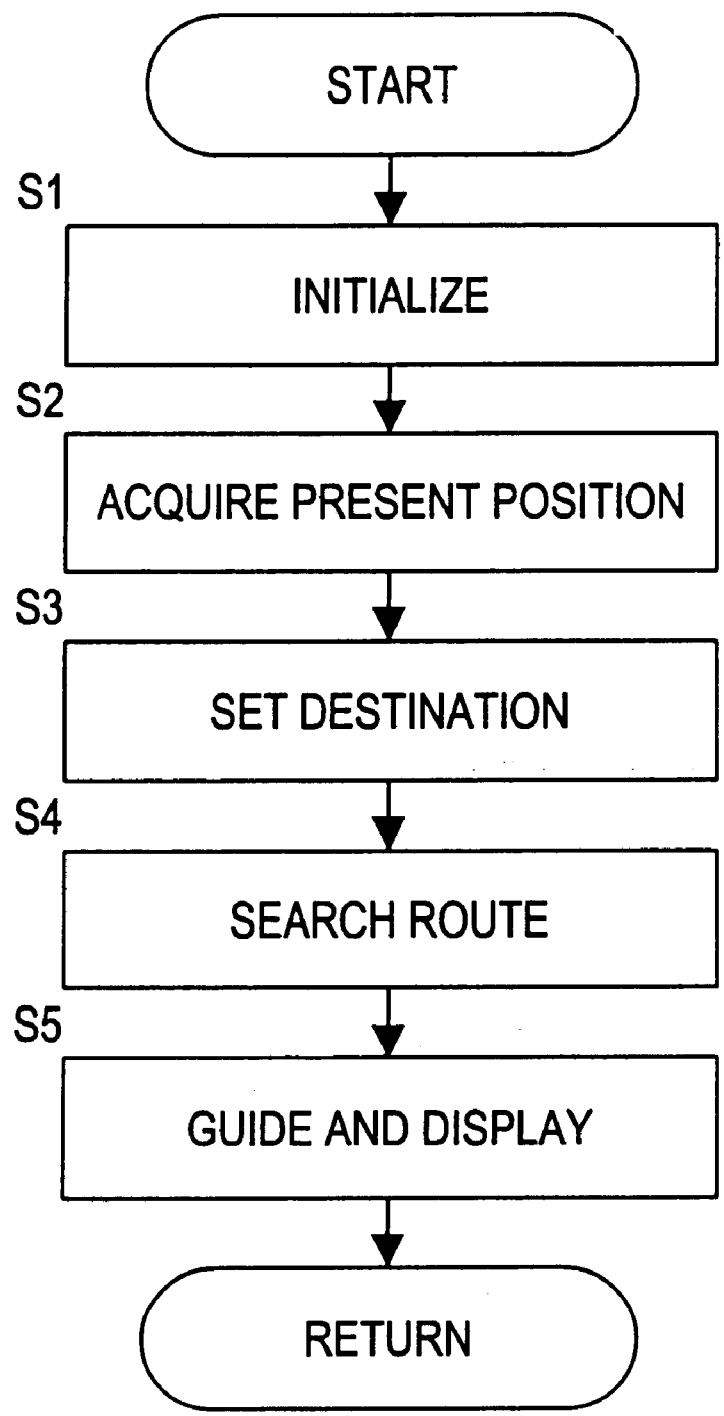
FIG. 4 is a flowchart for describing the processing flow of the overall system of the vehicle navigation system according to the present invention.

FIG. 4 is a flowchart describing the process of the overall navigation system according to the invention. FIG. 5 is a diagram for explaining the a route set by a route search executed as in FIG. 4. As shown in FIG. 4, a CPU 40 comprising a central processing unit 4, reads out a navigation program from a CD-ROM after executing initialization processing. The read program is stored in a flash memory 41 and activated (step S1), and the navigation system then detects a present position by using a present position detection device 2, displays a map of the vicinity of the present position including the name of the present position, etc. (step S2). Next, the navigation system sets a destination by using telephone number, address, facility name, and registered location, etc. (step S3), and executes a route search from the present position to the destination (step S4). As a result of this route search, the route to the destination is set as guidance road number data so that the roads to guide the route are arranged numerically, as shown in FIG. 5. When the route is determined, the navigation system repeatedly performs display and/or audio output processing of route guidance until the vehicle reaches the destination by keeping track of the present position through the present position detection device 2 (step S5).

Figure 6:
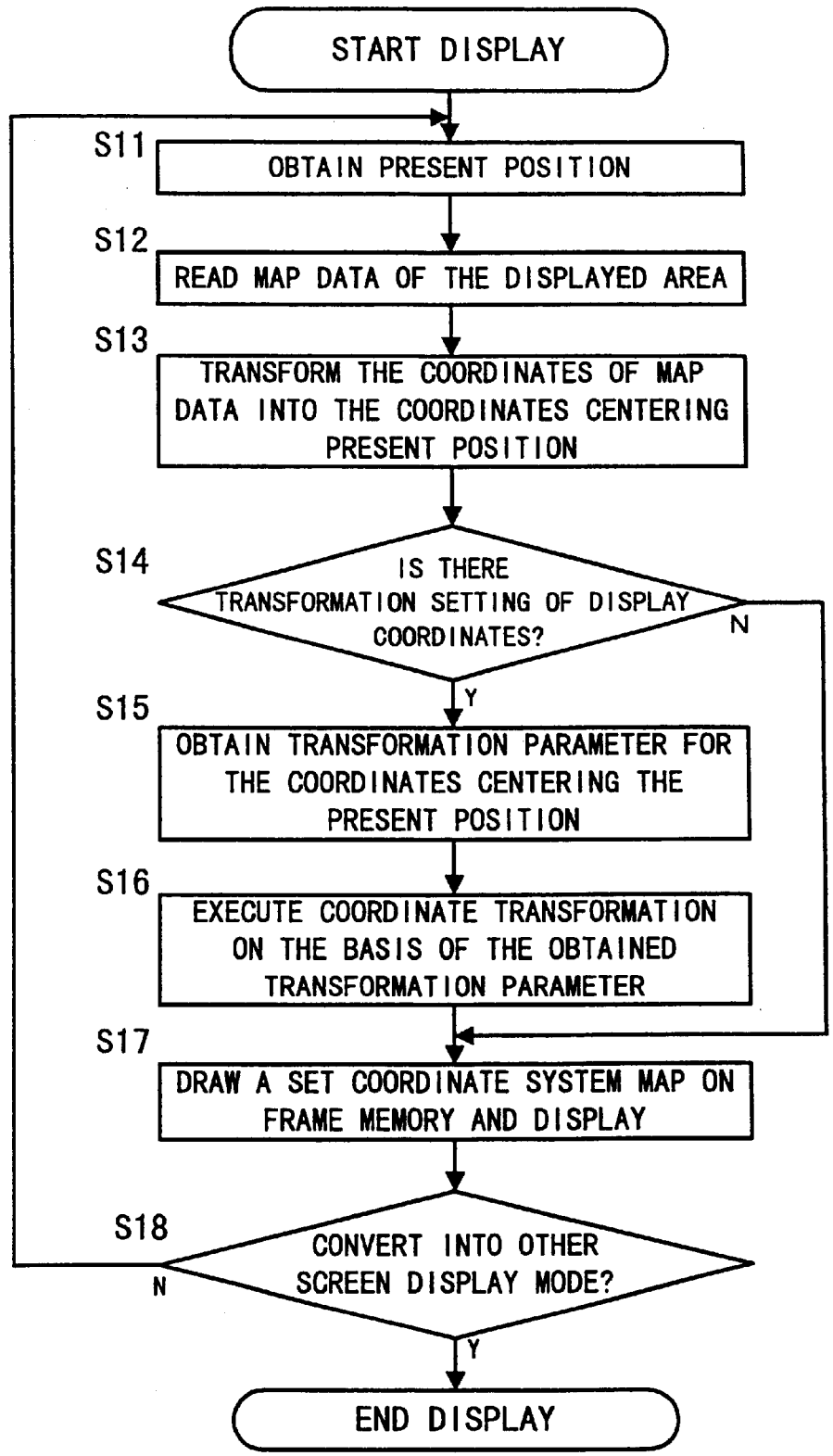
FIG. 6 is a flowchart for describing an example of the display processing of a map centering the present position according to the invention.

The invention enables a driver to obtain a sense of distance unaffected by the direction by relating coordinates on a map on the display 12 to coordinates on the curved plane, transforming the coordinates on the curved plane into coordinates on the projected plane and displaying the map more widely with the distance from the present position, all of which occurs in the course of the present position detection processing in step S2, destination setting processing in step S3 and route guidance display processing in step S5. FIG. 6 is a diagram describing one of the display examples of the display processing.

As shown in FIG. 6, a map display device according to the invention, when displaying a map around a present position, obtains the present position, (step S11), reads map data relating to the displayed area centering the present position according to scale (step S12), and transforms the coordinates of the map data into the coordinates around the present position (step S13). Then the device reads map data relating to the displayed area from the CD-ROM, stores the data in RAM, and executes coordinate transformation and picture processing. The system may also store map data relating to a wider area than the displayed area in RAM, extract data needed to be displayed, and execute picture processing. Next, the device determines whether there is a map coordinate transformation setting to display the coordinates not on a plane, but on a curved plane, onto a projected plane (step S14), obtains a transformation parameter corresponding to the coordinates around the present position when there exists the setting, (step S15), and executes a coordinate transformation according to the obtained transformation parameter (step S16). Then the device draws a map with a set coordinate system on frame memory and displays the map on a display 12 (step S17). When no instructions to switch to other display modes is given, the device returns to step S11 and executes the same processing repeatedly during the tracking of the present position. The processing shown in FIG. 6 is one example of the coordinate transformation processing through the coordinate transformation method according to the invention.

Figure 8:
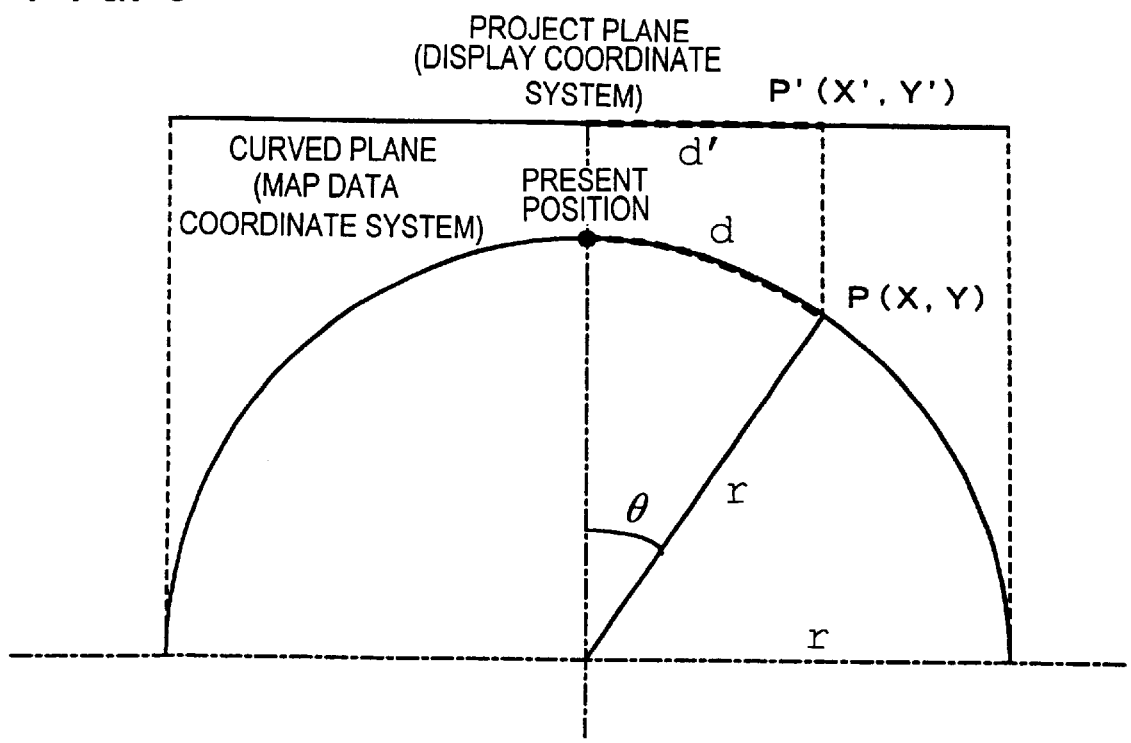
FIG. 8 is a diagram for describing transformation parameter setting in case where a curved plane is regarded as a spherical plane.
Figure 9:
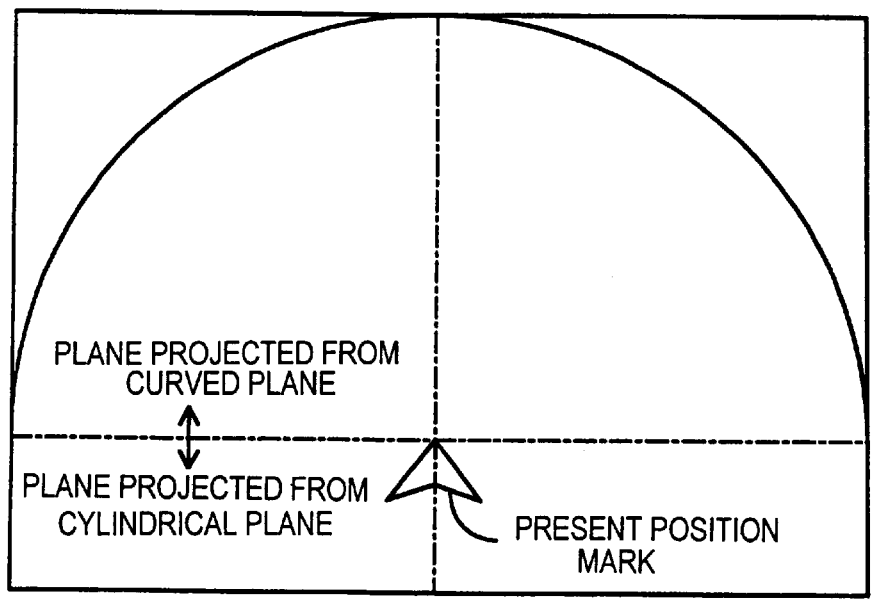
FIG. 9 is a diagram for describing display layout of a transformed map.
Figure 10:
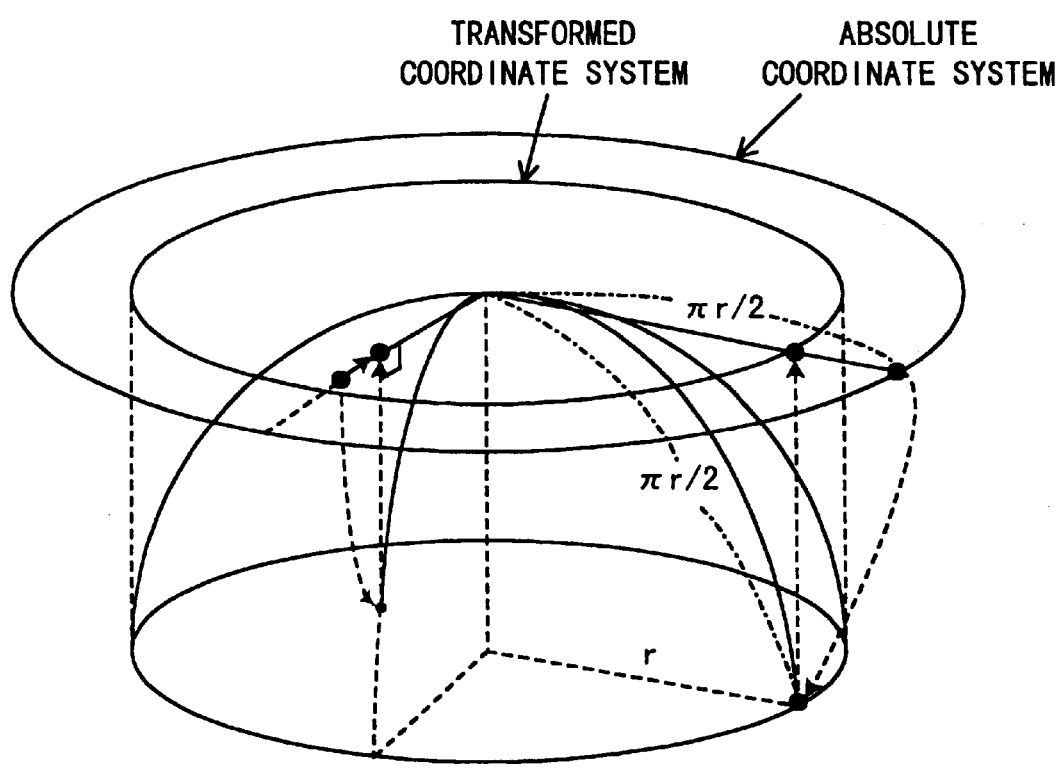
FIG. 10 is a diagram for describing relationship between transformed coordinates in a hemisphere image.

FIG. 7 shows one example of the coordinate transformation parameter table for map display processing. FIG. 8 illustrates the description of the transformation parameter setting in the case of taking a curved plane as a spherical plane. FIG. 9 shows one example of a map display layout after transformation. FIG. 10 illustrates the relationship between the transformed coordinates in hemispheric image.

A transformation parameter is set according to the distance d from the present position as shown in FIG. 7. The function of distance d, $f_1(d)$, $f_2(d)$, $f_3(d)$, ... is set according to the vicinity of the present position where the distance d is shorter than D1, or the area where the distance d is longer than D1 and shorter than D2, etc. For example, when the distance d indicates to display the vicinity of the present position which distance from the present position is shorter than D1 on the plane, $f_1(d)=1$. When the distance d indicates not to display the area which distance from the present position is longer than $D_n$, $F_n(d)$=neglect or infinity.

For example, when a curved plane is regarded as a spherical plane, as shown in FIG. 8, the coordinates of the map data are assumed to be on the spherical plane and transformed into coordinates projected on a plane (display coordinate system). Therefore, since distance d from the present position is transformed into d', its transformation parameter f(d) is calculated from the following equation: radius of a sphere: r, solid angle: θ(rad).

$$f(d)=(r \sin θ)/d$$

$$θ=d/r \quad θ≤π/2$$

$d≤πr/2$ is used as the bounds. According to the above mentioned transformation parameter f(d), sin θ is about d/r in the vicinity of the present position where θ is close to 0. Therefore, f(d) is close to 1 and when θ is π/2, f(d) is r/d. Coordinates (X', Y') of the position P' projected on a plane, which is obtained from coordinates (X, Y) of the position P at a distance of d from the present position which is obtained by using the above described transformation parameter f(d), is calculated by the following equation:

$$\begin{aligned} X' &= X \cdot f(d) = X \cdot (r \sin θ)/d \\ &= (X \cdot r/d) \sin(d/r) \\ Y' &= Y \cdot f(d) = Y \cdot (r \sin θ)/d \\ &= (Y \cdot r/d) \sin(d/r) \end{aligned}$$

FIG. 9 illustrates one example of the screen layout displaying upward from the present position mark when a map centering the present position is displayed by executing the above coordinate transformation. Regarding the screen shown in FIG. 9, the location of the present position mark is designated downward from the center of the display screen. Regarding the map coordinates downward from the present position mark, only the X coordinate is transformed as being on a curved plane (lateral direction of FIG. 8). This means that since the map coordinates downward from the present position mark are regarded as being on the cylindrical plane and projected on the plane, the transformed coordinates are not compressed in the vertical direction. FIG. 10 illustrates the relationship between the transformed coordinates in a hemispheric image. This figure indicates a coordinate system comprised of the coordinates of map data as an absolute coordinate system, and a coordinate system projected to a plane from the absolute coordinate system by the transformation parameter as a transformed coordinate system.

Figure 11A:
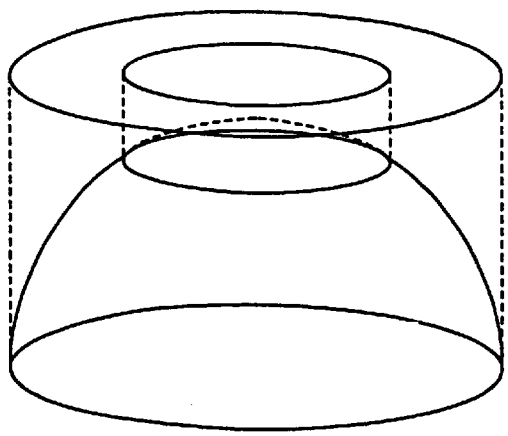
FIGS. 11A–11D are diagrams for describing the variations of curved planes where the coordinates are transformed.
Figure 11B:
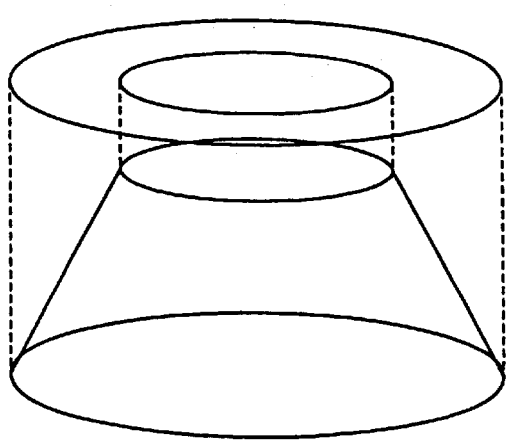
Figure 11C:
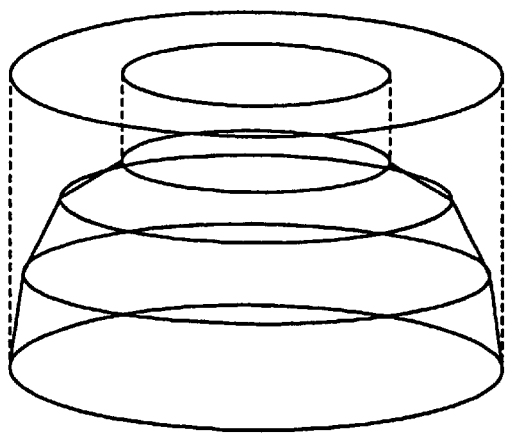
Figure 11D:
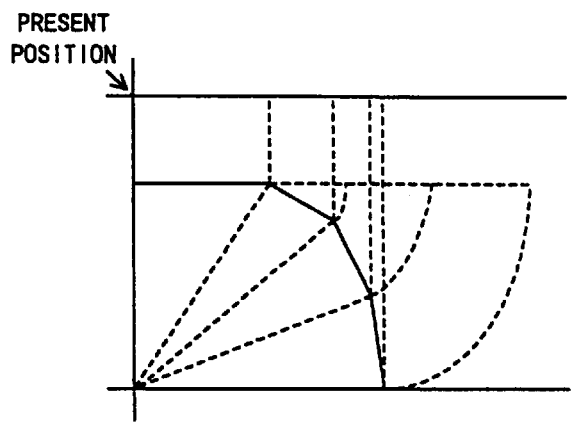

FIGS. 11A–11D illustrate examples of a variety of curved planes. A curved plane with the coordinates of map data, as shown in FIG. 10, relates the coordinates in the vicinity of the present position within a fixed distance to the ones on a plane and transforms the coordinates on the plane into a projected plane at a ratio of one to one, or the coordinates outside the fixed distance to the ones on a curved plane, to a spherical plane by using a partial cone plane, as shown in FIG. 11B, or to a curbed plane that a plurality of partial cone planes with different vertex angles are connected, as shown in FIG. 11C, and transforms the ones on the curved plane into the ones on the projected plane, as shown in FIG. 11A. As shown in FIG. 11C, as the distance from the present position increases at a fixed rate, the compression rate increases, information close to the present position is enlarged, and a map providing information relating to a wider area is displayed with distance from the present position at a fixed rate. Regarding coordinate transformation, as shown in FIG. 11C, a transformation parameter, as described in FIG. 6, corresponding to the distance from the present position can be indicated by a linear function which alters the slope of each segment at a demarcation value (D1, D2, . . . ).

Figure 12A:
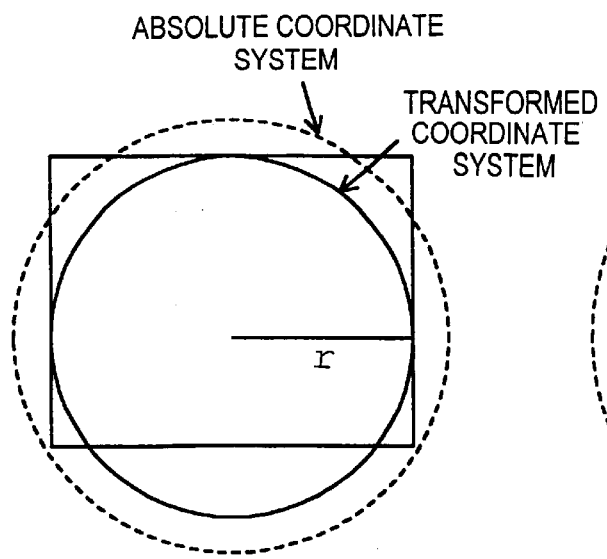
FIGS. 12A–12D are diagrams for describing the setting of the system of the transformed coordinates and its area to be displayed.
Figure 12B:
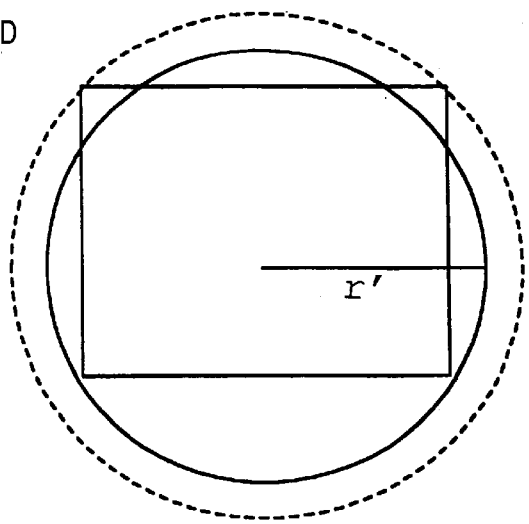
Figure 12C:
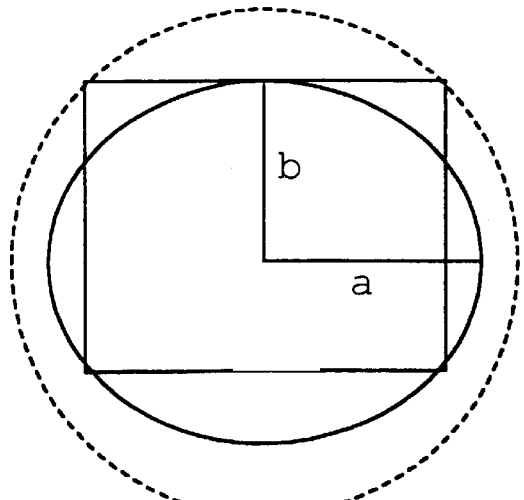
Figure 12D:
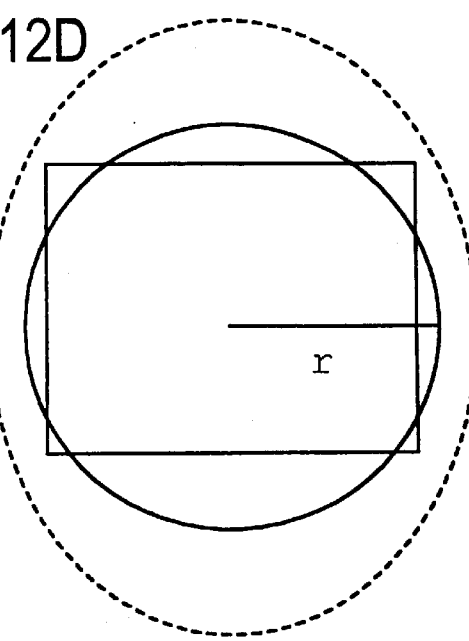

FIGS. 12A–12D illustrate examples of the setting of a transformed coordinate system and its display area. In the display area, as in the spherical plane shown in FIG. 12A, the diameter of a sphere can be set as the width of the display area, or a narrower width can be set, such as the diameter of a sphere, as shown in FIG. 12B. Further, as shown in FIG. 12C and 12D, by using an oval spherical plane as a curved plane, coordinate transformation can also be executed.

Figure 13B:
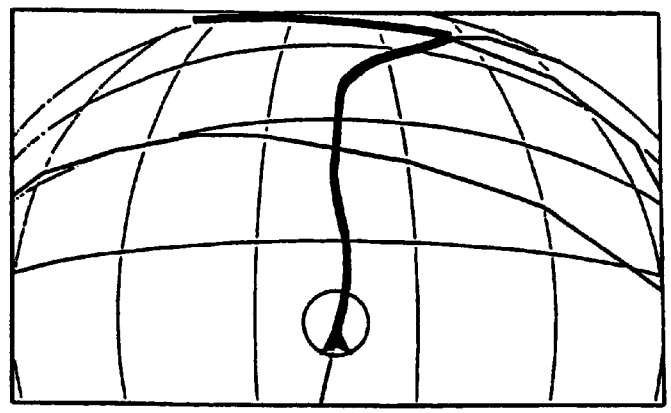
Figure 13C:
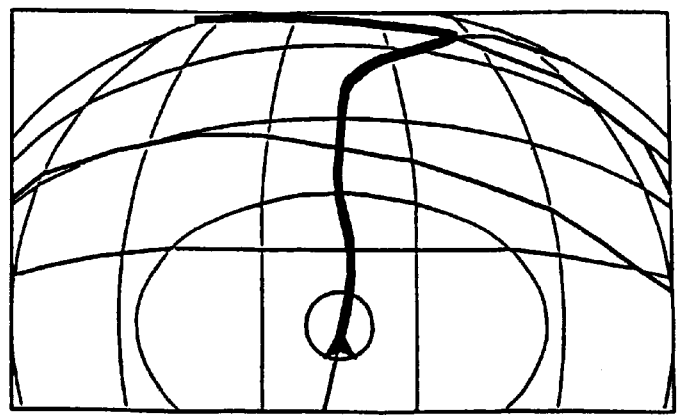

FIGS. 13A–13C illustrate examples of map display by comparing a plane map to transformed coordinate maps. FIG. 13B illustrates an example of a map display which relates original coordinates on a plane map, as shown in FIG. 13A, to the coordinates on a curved plane, transforms the ones on the curved plane into the ones on the projected plane, as shown in FIG. 10, and displays a map which is a part of the projected map, as shown in FIG. 12B. Further, FIG. 13C illustrates an example of a map display which relates the coordinates in the vicinity of the present position to the ones on the plane and the coordinates outside the area to the ones on the spherical plane, as shown in FIG. 11A, and transforms the respective coordinates onto the projected plane.

Figure 14A:
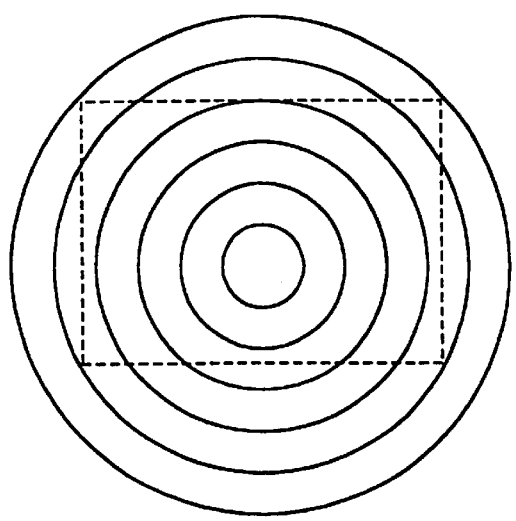
FIGS. 14A and 14B illustrate examples of display change when coordinate transformation is executed by one transformation parameter.
Figure 14B:
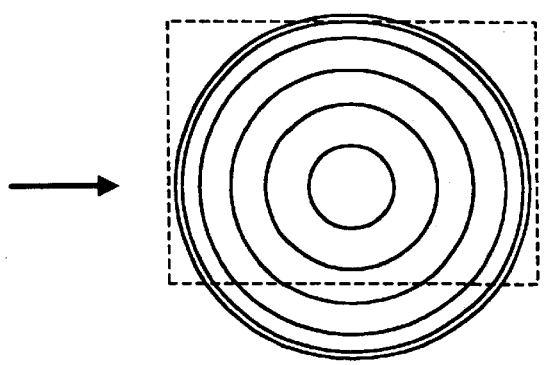
Figure 15A:
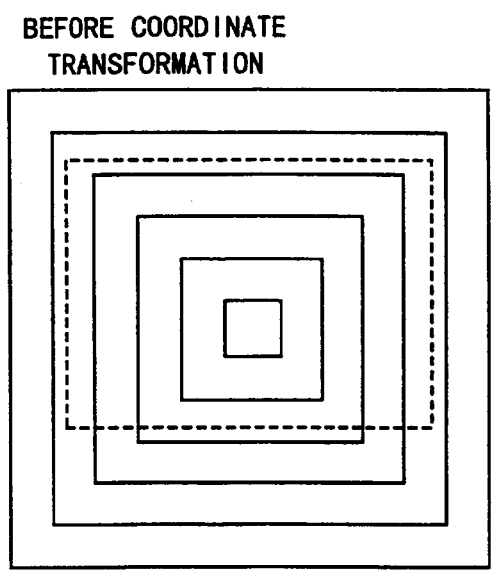
FIGS. 15A–15C illustrate a display change when transformation parameters relating to X direction and Y direction are set separately and coordinate transformation is executed.
Figure 15B:
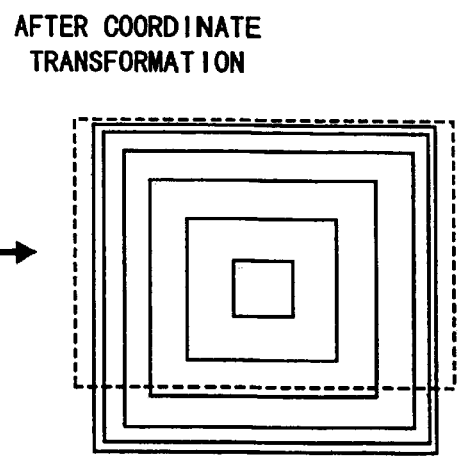
Figure 15C:
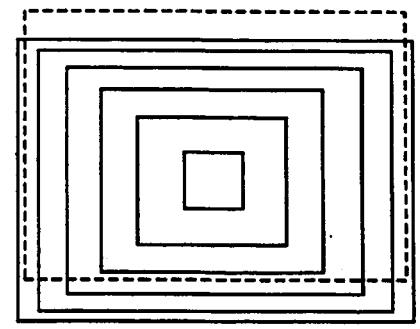

This invention is not limited to the above mentioned embodiments and can provide variations. FIGS. 14A and 14B illustrate the change of display when coordinate transformation is executed by one transformation parameter. FIGS. 15A–15C illustrate the change of display when coordination transformation is executed by setting a transformation parameter relating to the X-direction separately from the one relating to the Y-direction.

The embodiments shown in FIGS. 8 and 9, for example, describe the coordinate transformation parameter setting when the present position of a vehicle is taken as a center and a curved plane as a spherical plane. That is, the device obtains the distance of d from the coordinates of the map data to the coordinates of the present position by setting the present position as a center, and sets a transformation parameter (function) as a function of distance d by using solid angle θ, as shown in FIG. 8. According to this embodiment, the compression rate of the change of display between before and after coordinate transformation, increases as the distance from the present position increases, as shown in FIGS. 14A and 14B. The above embodiments describe that the device sets a transformation parameter based on the distance d from the present position to the map data, and transforms the X-coordinate and the Y-coordinate by using one transformation parameter. Additionally, the invention may also set a transformation parameter relating to the X-direction separately from a transformation parameter relating to the Y-direction and transform X and Y coordinates using the respective transformation parameters.

To be more specific, the coordinates of the present position are indicated as $(X_0, Y_0)$, and X-element and the Y-element of a solid angle θ are respectively indicated as $θ_X$ and $θ_Y$. By setting the transformation parameter for the X-direction, $f(x)=(r \sin θ\ x)/(|X-X0|)$ and for the Y-direction, $f(y)=(r \sin θ\ y)/(|Y-Y0|)$ the coordinates (X', Y') of the position P' projected on a plane is calculated by the following equation, $$X'=X·f(x)$$

$$Y'=Y·f(y).$$

According to this embodiment, display changes between before and after coordinate transformation, is illustrated in FIGS. 15A and 15B. Further, for example, in order to increase the compression rate of the Y-direction, display change can be executed by multiplying the transformation parameter of the Y direction by a constant.

In the above mentioned embodiments, it is described that the device displays a map centering the present position of a vehicle as a coordinate transformation reference point. This can be applied when the device displays a map for other purposes, such as destination setting, departing point setting, or map display in the virtual travel mode, etc. and also can set a cursor position as a coordinate transformation reference point at the center of the curved plane. Further, the device can provide broader sight of the forward direction by setting and displaying this coordinate transformation reference point below the center of the screen. Although being set to execute transformation processing for all the map data of the displayed area, the device may set the transformation range in order not to execute processing regarding points outside the set area.

As clearly stated in the above explanation, this invention enables a map to cover the wider area by regarding the map as being on the curved plane and displaying the coordinates on the projected plane transformed from the coordinates on the spherical plane. This invention also enables the vicinity of the present position to be displayed with little distortion by locating the present position in the center of the curved plane. Further, by displaying the coordinates of the vicinity of the present position within the specified distance on the plane, the vicinity of the present position can be displayed with no distortion. By using a spherical plane or an oval spherical plane, the surroundings area around a present position are distorted almost equally. Therefore, this can avoid a distortion differential according to the direction and improve a driver's sense of direction. By adopting a distorted spherical plane, such as an oval spherical plane as a curved plane, the system can display the forward area more widely and control the amount of the change linearly with the distance from the present position by changing the curved plane.

What is claimed is:

1. A map display device, comprising:

information memory means for storing map data;

display means for displaying a map based on map data stored in said information memory means; and display control means for controlling a readout of map data from said information memory means and the map display on said display means, comprising:

coordinate transformation means for transforming coordinates on a curved plane into coordinates on a projected plane, wherein said display control means relates coordinates on the map to coordinates on the curved plane with respect to coordinates of a coordinate transformation reference point, transforms coordinates on the curved plane into coordinates on the projected plane using said coordinate transformation means, and displays a projected map, based on coordinates transformed on the projected plane, on said display means.

2. The map display device according to claim 1, wherein the curved plane is a spherical plane.

3. The map display device according to claim 1, wherein the curved plane is an oval spherical plane.

4. The map display device according to claim 1, wherein said display control means relates coordinates on a map area within a fixed radius from the coordinate transformation reference point, to the coordinates on the plane and transforms coordinates on the plane into coordinates on the projected plane, and further relates coordinates of the map area which are outside said specified radius to coordinates on the curved plane and transforms coordinates on the curved plane into coordinates on the projected plane.

5. The map display device according to claim 1, wherein said display control means relates coordinates on the map to coordinates on the curved plane which curvature is gradually reduced at every fixed radius around the coordinate transformation reference point, and transforms coordinates on the curved plane into coordinates on the projected plane using said coordinate transformation means.

6. The map display device according to claim 1, wherein said display control means relates only X-coordinates of coordinates on the map below the coordinate transformation reference point to coordinates on the curved plane, and transforms coordinates on the curved plane into coordinates on the projected plane by said coordinate transformation means.

7. A map display device according to claim 1, wherein the curved plane is a partial cone plane.

8. Map display device, comprising:

information memory means for storing map data;

present position detection means for detecting a present position of a vehicle;

display means for displaying a map on the basis of map data stored in said information memory means; and display control means, which has coordinate transformation means for transforming coordinates on the curved plane into coordinates on the projected plane, for controlling a readout of map data from said information memory means and a map display on said display means, wherein said display control means relates coordinates on the map to coordinates on the curved plane with respect to coordinates of the present position detected by said present position detection means, transforms coordinates on the curved plane into coordinates on the projected plane using said coordinate transformation means, and displays a projected map based on coordinates transformed on the projected plane, on said display means.

9. The map display device according to claim 8, wherein the curved plane is a spherical plane.

10. The map display device according to claim 8, wherein the curved plane is an oval spherical plane.

11. The map display device according to claim 8, wherein the display control means relates coordinates on a map area within a fixed radius from the coordinate transformation reference point, to the coordinates on the plane and transforms coordinates on the plane into coordinates on the projected plane, and further relates coordinates of the map area which are outside the specified radius to coordinates on the curved plane and transforms coordinates on the curved plane into coordinates on the projected plane.

12. The map display device according to claim 8, wherein the display control means relates coordinates on the map to coordinates on the curved plane which curvature is gradually reduced at every fixed radius around the coordinate transformation reference point, and transforms coordinates on the curved plane into coordinates on the projected plane using the coordinate transformation means.

13. The map display device according to claim 8, wherein the display control means relates only X-coordinates of coordinates on the map below the coordinate transformation reference point to coordinates on the curved plane, and transforms coordinates on the curved plane into coordinates on the projected plane by the coordinate transformation means.

14. A map display device according to claim 8, wherein the curved plane is a partial cone plane.

15. A computer readable recording medium for storing programs, comprising:

a program that relates coordinates on a map to coordinates on a curved plane with respect to coordinates of a coordinate transformation reference point;

a program that transforms coordinates on the curved plane into coordinates on a projected plane; and a program that displays a projected map based on coordinates transformed on the projected plane.

* * * * *